United States Patent
Birnbaum et al.

[15] 3,648,192
[45] Mar. 7, 1972

[54] CONTINUOUS-WAVE NONSPIKING SINGLE MODE LASER

[72] Inventors: Milton Birnbaum, Peninsula; Curtis L. Fincher, Torrance, both of Calif.

[73] Assignee: The United States of America as represented by the Secretary of the Air Force

[22] Filed: Jan. 28, 1971

[21] Appl. No.: 110,497

[52] U.S. Cl. ........................................................331/94.5
[51] Int. Cl. .......................H01s 3/10, H01s 3/05, H01s 3/04
[58] Field of Search ................................................331/94.5

[56] References Cited

UNITED STATES PATENTS 3,487,330 12/1969 Gudmundsen...........................331/94.5
3,521,189 7/1970 Koenig.....................................331/94.5

OTHER PUBLICATIONS

Korobkin et al., Soviet Physics– Tech. Physics, vol. 13, No. 3, Sept. 1968, pp. 367– 372

Primary Examiner—Ronald L. Wibert
Assistant Examiner—R. J. Webster
Attorney—Harry A. Herbert, Jr. and George Fine

[57] ABSTRACT

A continuous-wave, nonspiking, single-mode laser is provided wherein continuous-wave, nonspiking operation of ruby lasers cooled to 77 and 4.2°K. is obtained by end pumping a laser rod with the output of a CW argon ion laser. The laser rod is comprised of six discs, three ruby and three sapphire separated by spacers.

5 Claims, 4 Drawing Figures

Patented March 7, 1972 3,648,192

INVENTORS
MILTON BIRNBAUM
CURTIS L. FINCHER
BY Harry A. Herbert Jr.
George Fine
ATTORNEYS

RUBY $R_1$ FLUORESCENT LINE AT 77°K AND LASER MODE SPACING

CONTINUOUS-WAVE NONSPIKING SINGLE MODE LASER

BACKGROUND OF THE INVENTION

This invention relates to ruby lasers and more particularly to a continuous-wave, nonspiking, single-mode laser.

The first CW ruby laser was that of Nelson and Boyle, as described in Appl. Opt. 181 (1962) which utilized a lightly doped (0.005 percent Cr. concentration) trumpet-shaped ruby cooled to 77° K., and pumped by a short mercury arc lamp specially designed to focus the pump light into the trumpet end of the ruby. A puzzling feature of their results was that the CW ruby laser output consisted of relaxation oscillations, similar to those customarily observed in the output of pulsed ruby lasers. Subsequently, a number of room temperature CW ruby lasers utilizing a variety of pumping configurations have been constructed. In all cases, the CW output exhibited relaxation oscillations. Thus, despite intensive study, CW, nonspiking ruby laser operation has not been achieved.

Spectral measurements of the output of the CW ruby laser of the present invention were obtained with a dual grating spectrograph, a scanning Fabry-Perot spectrometer, and a number of panoramic receivers (spectrum analyzers) spanning the range from 0 to 30 GHz. These measurements established that the output of the ruby laser was single axial mode of lowest transverse order, namely, $TEM_{00q}$. Measurement of the far field pattern showed a laser diffraction angle consistent with a $TEM_{00q}$ mode. The temperature of the pumped laser rod was determined by measurement of the output wave length, which indicated temperatures of about 30° K. This is the lowest temperature at which oscillation has been achieved in ruby. Operation at still lower temperatures should be readily attainable. Oscillation linewidths of CW ruby lasers at 77 and 4.2° K. as narrow as 35 KHz. (full width) have been observed. These results are indicative of the possibility of development of extremely stable ruby lasers and of a ruby laser wavelength standard.

SUMMARY OF THE INVENTION

A continuous-wave, nonspiking, single-mode laser is provided in which the laser rod is comprised of six discs, three ruby and three sapphire, separated by five spacers. The stack of three sapphire discs constitutes a resonant reflector of about 90 percent of reflectivity, while the stack of ruby discs provides a second resonant reflector and necessary gain. The laser rod is cooled to 77 and 4.2° K. A CW argon ion laser was utilized to end pump the laser rod to obtain a continuous-wave, nonspiking operation.

An object of the invention is to provide a continuous-wave, nonspiking, single mode laser.

Another object of the invention is to provide a continuous-wave, nonspiking, single-mode laser in which a laser rod is simultaneously cooled and end-pumped.

These and other advantages, features and objects of the invention will become more apparent from the following description taken in connection with the illustrative embodiment in the accompanying drawings, wherein.

DETAILED DESCRIPTION OF THE PREFERRED EMBODIMENT

Figure 1:
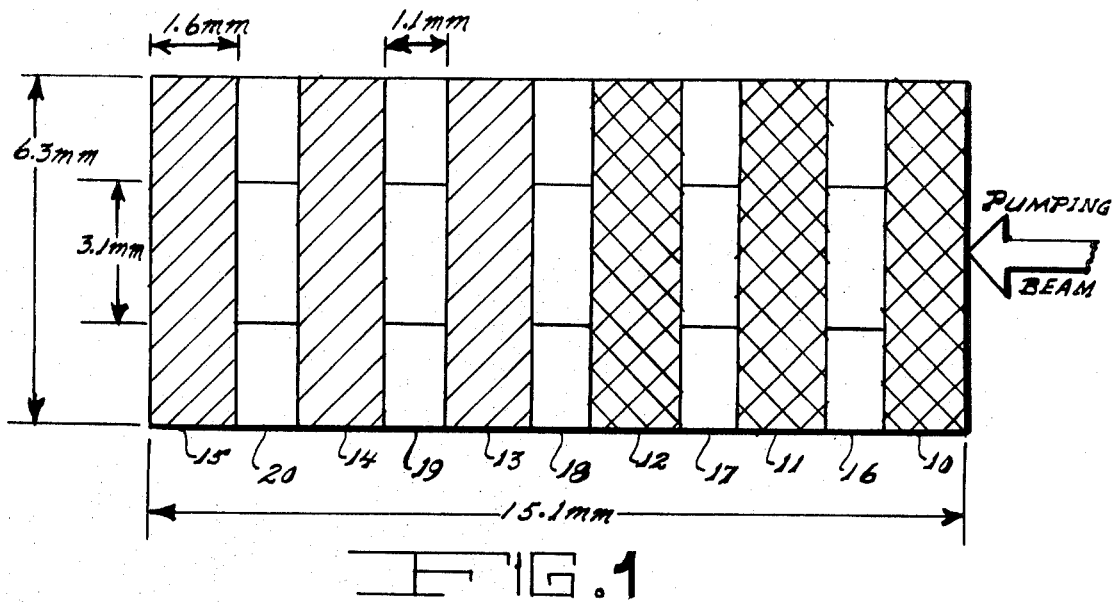
FIG. 1 illustrates the laser rod design of the present invention.

Now referring in detail to FIG. 1, there is shown the laser rod to be cooled and end-pumped in accordance with the invention. The laser rod is comprised of six discs, three ruby discs 10, 11, 12 and three sapphire discs 13, 14, and 15, each 1.6 mm. thick and 6.3 mm. in diameter, separated by five spacers 16, 17, 19, 19 and 20; each being 1.1 mm. thick and 6.3 mm. in diameter with a 3.1 mm. hole through their centers. The spacers may be of the Lucalox type. As aforementioned, two sets of discs are employed, one set fabricated of 60°, 0.05 percent Cr. conc., Czochrolski grown ruby and sapphire and a second set of zero degree, 0.05 percent Cr. conc., material. Each of the six segments and five spacers were polished flat to within one-tenth wavelength and parallel to within 3 seconds of arc; the whole assembly is held together by optically contacting the discs and spacers. The stack of three sapphire discs constitutes a resonant reflector of approximately 90 percent reflectivity, while the stack of ruby discs provides a second resonant reflector and the necessary gain. The principle reason for this design of the ruby laser is to circumvent the difficulty posed by attempts to operate ruby lasers with dielectric film mirrors applied to the ends of the rod since the focused beam for end-pumping damaged the dielectric film mirrors. The resonant reflector design also provides the axial mode selection required for single mode operation.

Figure 2:
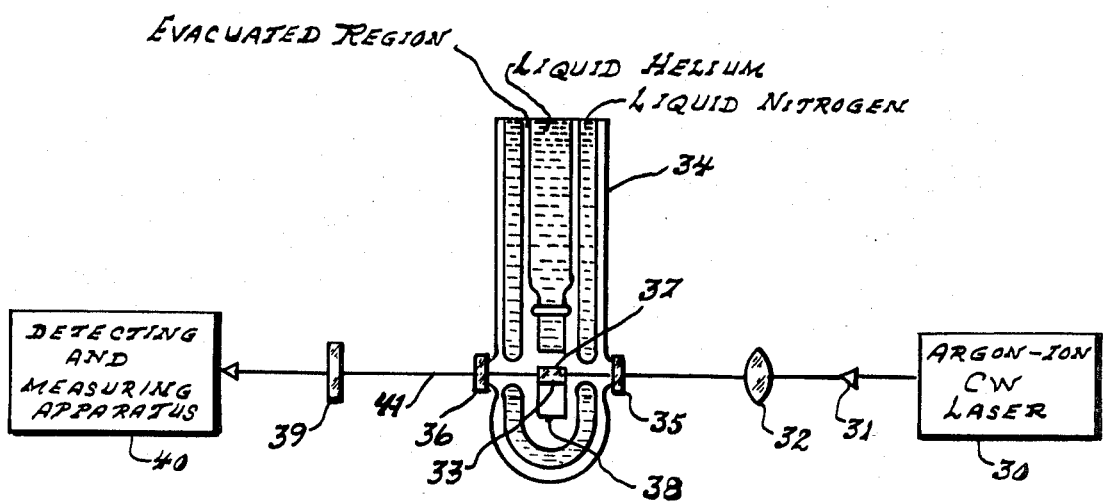
FIG. 2 shows a preferred embodiment of the continuous-wave, nonspiking, single-mode laser.

Now referring to FIG. 2, there is shown induction-excited CW argon ion laser, operating at a single-wave length of 5,145 A., measured with TRG-100 thermopile, at approximately 900 mW. However, most of the data was obtained with the pump power in the range of 400 to 700 mW. The output of the argon ion laser was plane polarized vertically within 2 degrees and the ruby was rotated to the position of maximum absorption of pump light. The CW argon ion laser is conventional and may be a Spectra-Physics Model 140.

The diameter of unfocused beam 31 was approximately 1.6 mm. at the $1/e$ intensity point. Fifteen centimeters focal length lens 32 was used to focus the pump light into ruby laser rod 33. Other focal length lenses were tried but the 15 cm. F.L. lens resulted in the lowest threshold and maximum output power of the ruby laser. The focused ion laser beam was observed by scattered light in an optically polished block of quartz; a beam diameter of approximately 80 microns was determined with a calibrated microscope.

Cooling of ruby laser 33 to 77 and 4.2° K. was accomplished by means of Hersch design liquid Helium double dewar 34 shown in cross section which includes liquid helium and nitrogen. Input window 35 on the dewar is a ⅛-inch thick fused silica optical flat; the remaining windows 36 were ¼-inch thick fused silica optical flats. The ruby laser is supported in copper sleeve 37 which applied a slight pressure to the assembly to prevent the discs from coming apart at reduced pressure and temperature. A calibrated carbon resistor thermometer may be imbedded in a small hole drilled into copper cold finger 38 close to the laser assembly to be used to monitor the temperature. It is noted that any other conventional cooling means may be utilized.

Figure 3:
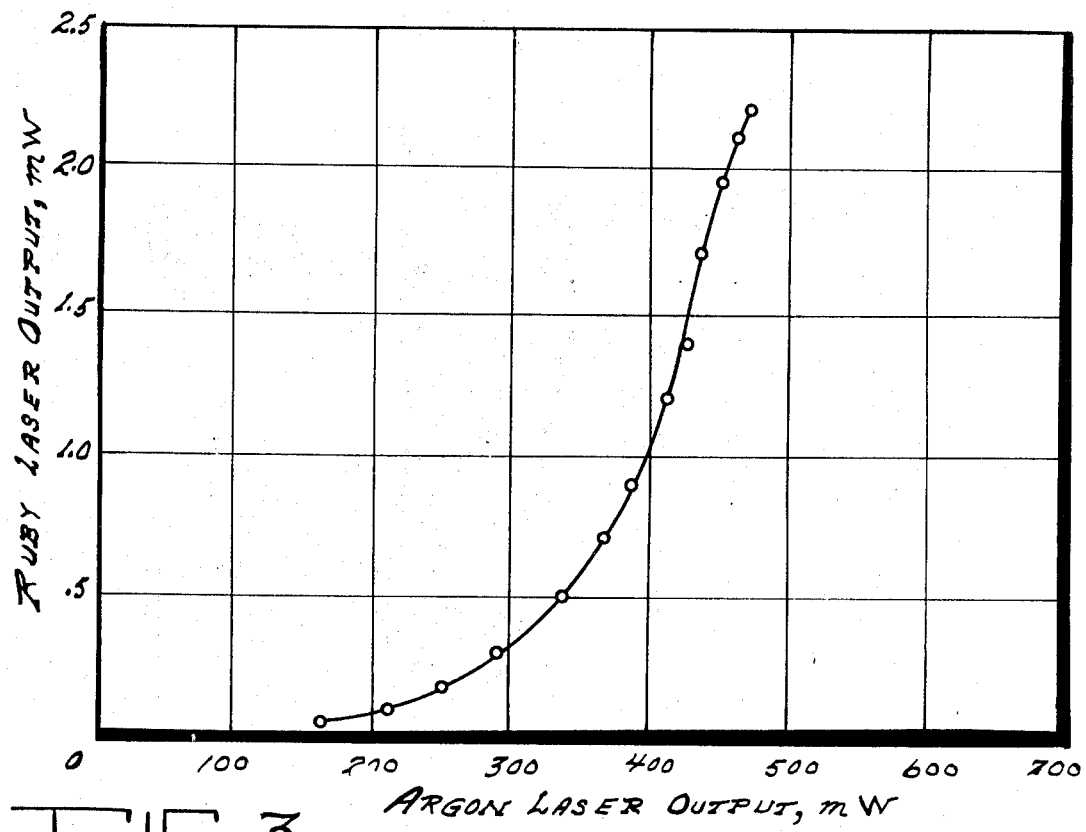
FIG. 3 shows a graph of the output power from the ruby resonant reflector end of the laser.

It is noted that with a pump power of approximately 500 mW., ruby laser oscillations were observed approximately 120 µs. after the onset of the pumping pulse. A graph showing the output power from the ruby resonant reflector end of the laser is shown in FIG. 3. Oscillation was not usually observed for pump powers less than 100 mW.

Figure 4:
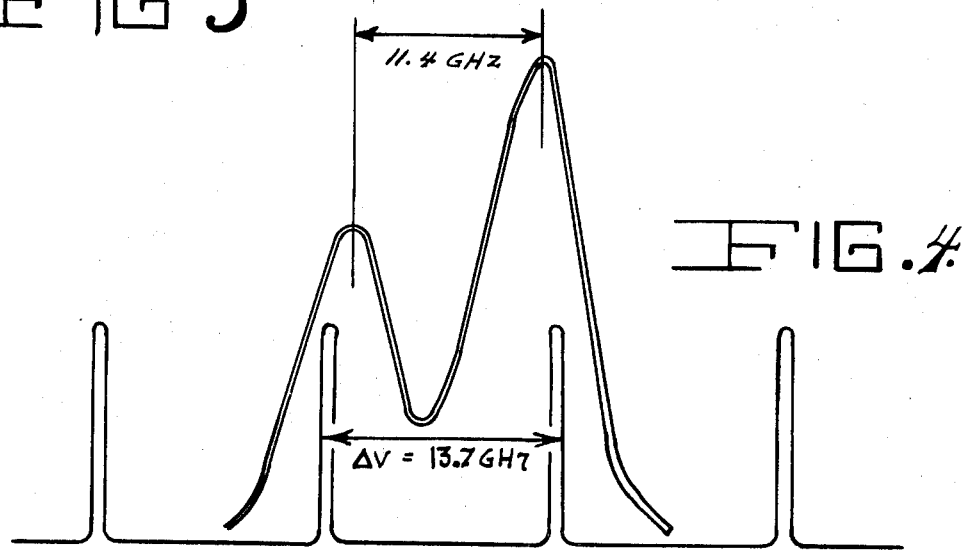
FIG. 4 illustrates ruby $R_1$ fluorescent line at 77° K. and laser mode spacing.

Single longitudinal mode operations of the laser was insured by the resonant reflector construction of the ruby laser. The relationship between the cavity mode spacing and the fluorescent line width is shown schematically in FIG. 4. The longitudinal mode spacing was calculated using the equation $$\sigma v = c/2nL \tag{1}$$

where $\sigma v$ is the frequency difference between the longitudinal modes; $c$, velocity of light in vacuum; $n$, index of refraction of material in the cavity; and $L$, length of the cavity. The shortest length in the resonant reflector assembly (FIG. 1) is 1.1 mm. and produces $\sigma v$ of 13.7 GHz. It is clear that only a single longitudinal cavity mode falls within the fluorescence of the ruby. This result is in agreement with the experimental results.

At liquid helium temperatures, a second weaker laser line appeared spaced 12.4 GHz. from the stronger line. This was attributed to an adjacent cavity longitudinal mode (see FIG. 4) oscillating close to the center of the $E - {}^4A_2 (\pm ½)$ transition.

Single transverse mode selection was accomplished by pumping only a small filament of ruby. This is, in effect, similar to the use of "pinhole" transverse mode selectors, which utilize a small aperture within the laser cavity to reduce the cavity Q for higher transverse modes. The Fresnel number for the ruby laser assembly was computed using the equation $$N = a_1 a_2 / L\lambda \qquad (2)$$

where $a_1$ and $a_2$ are the radii of the effective mirror aperture; $L$, the effective length of the laser assembly; and $\lambda$, the wavelength. It is difficult to compute the diffraction losses since they depend sensitively upon the effective aperture of the mirrors; however, reasonable choices for the values of the parameters of equation (2) indicates a Fresnel number of approximately 0.6 for the $TEM_{00q}$ modes. This implies diffraction losses of several percent per pass. For small Fresnel numbers, the diffraction losses increase very rapidly for the higher order transverse modes. The pumping of a small filament of ruby provides very strong transverse mode selection, favoring oscillation in the $TEM_{00q}$ modes only.

A verification of single transverse mode operation was obtained by studying the far field diffraction pattern of the output of the CW ruby laser. The measured beam divergence at the 1/e intensity points was 11 mrad. in approximate agreement with the calculated diffraction loss for a $TEM_{00q}$ mode.

Single transverse mode operation was verified by the absence of beat signals corresponding to the frequency differences between the transverse modes. The computed frequencies for transverse mode beats were 0.5 GHz. and higher. Intensive search for such beats proved to be negative. Low-frequency beat signals in the range of 0 to 2.5 MHz. were observed. However, their variability in frequency and dependence on parameters to be described leave no doubts that they are not transverse mode beats. Thus, it is concluded that the CW ruby laser was operating single mode, $TEM_{00q}$.

Output laser beam 41, if desired, may be passed through conventional red density filter 39 to conventional detecting and measuring apparatus 40 which may be a combination of a photodiode (such as EG&G SGD-100 photodiode) and an oscilloscope. The spectral measurements of the output of CW laser of the present invention were obtained with a dual grating spectrograph, a scanning Fabry-Perot spectrometer, and a number of panoramic receivers (spectrum analyzers) spanning the range from 0 to 30 GHz. These measurements established that the output of the ruby laser was single axis mode of lowest transverse order, namely $TEM_{00q}$. Measurement of the far field pattern showed a laser diffraction angle consistent with a $TEM_{00q}$ mode. The temperature of the pumped laser rod was determined by the measurement of the output wavelength, which indicated temperatures of about 30° K. This is the lowest temperature at which oscillation has been achieved in ruby. Operation at still lower temperatures should be readily attainable. Oscillation bandwidths of CW ruby lasers at 77 and 4.2° K. as narrow as 35 KHz. (full width) have been observed. These results are indicative of the possibility of development of extremely stable ruby lasers and of a ruby laser wavelength standard.

While the FIG. 1 embodiment has been described with respect to ruby-sapphire discs, this same arrangement may be employed with other solid state laser materials. In addition to ruby, 3-level-laser systems would also include Erbium crystal and glass lasers at 1.6 $\mu$m., Neodymium glass and crystal lasers at 0.94 $\mu$m. and others. In any of these systems the pump beam is incident upon a series of laser material discs backed up by a series of sapphire discs constituting the resonant reflector.

In a 4-level-laser system the arrangement is somewhat simplified since only discs of the laser material are employed. The 4-level lasers include by far the largest group of solid state materials, examples of which are Praesodymium in $Ca\ WO_4$, europium in $Y_2 O_3$, Holmium in $Ca\ WO_4$, erbium in $Ca\ F_2$, Thullium in $Ca\ WO_4$, Ytterbium in glass, and uranium in $Ca\ F_2$.

While the invention is described as applied to a ruby laser, it is apparent that the same advantage, namely, single mode CW operation, is obtainable for many other solid state lasers.

What is claimed is:

1. A continuous-wave, nonspiking, single-mode ruby laser comprising a composite laser rod having two ends and a longitudinal axis, said laser rod being an assembly including a preselected number of discs of ruby laser material forming one set and a preselected number of sapphire discs forming a second set, each disc aligned with its major faces substantially orthogonal to the longitudinal axis of said assembly and each disc being separated from one another along said axis, said set of ruby discs and said set of sapphire discs each constituting a resonant reflector, discs to separate said ruby and sapphire discs from each other, said separating discs having centrally located holes of a predetermined diameter therethrough, said sapphire disc resonant reflector having approximately 90 percent reflectivity and said ruby disc reflector providing necessary gain, means to cool said laser rod during the operation thereof to preselected temperatures, and a CW argon ion laser to end pump said laser rod to provide a continuous-wave, nonspiking, single-mode output therefrom.

2. A continuous-wave, nonspiking, single-mode ruby laser as described in claim 1 where said first set consists of three ruby discs and said second set consists of three sapphire discs, and said separating discs consist of five.

3. A continuous-wave, nonspiking, single-mode ruby laser as described in claim 1 wherein said ruby laser rod consists of six discs, three ruby and three sapphire, each 1.6 mm. thick and 6.3 mm. in diameter, separated by five spacers 1.1 mm. thick and 6.3 mm. in diameter with a 3.1 mm. hole through their centers.

4. A continuous-wave, nonspiking, single-mode ruby laser as described in claim 1 wherein one of said sets of discs is fabricated of 60°, 0.05 percent Cr. conc., Czochrolski grown ruby and sapphire and said second set of zero degree, 0.05 percent Cr. conc., material.

5. A continuous-wave, nonspiking, single-mode ruby laser as described in claim 1 wherein each of said ruby, sapphire and spacer discs are polished to within one-tenth wavelength and parallel to within 3 seconds of arc with the assembly being held together by optically contacting all of said discs.

* * * * *